C. A. TOWER.
MECHANICAL MOVEMENT.
APPLICATION FILED JULY 17, 1909.
940,753.
Patented Nov. 23, 1909.
2 SHEETS—SHEET 1.
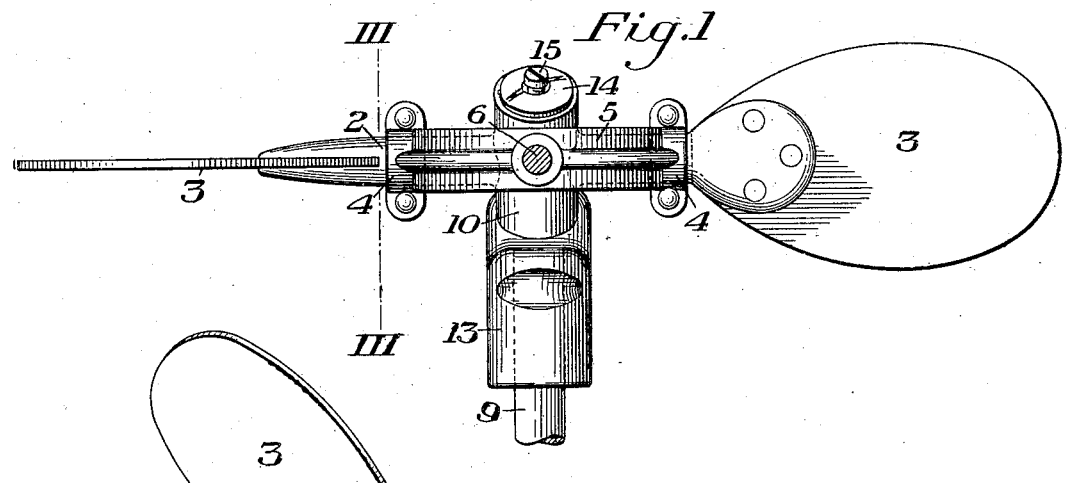
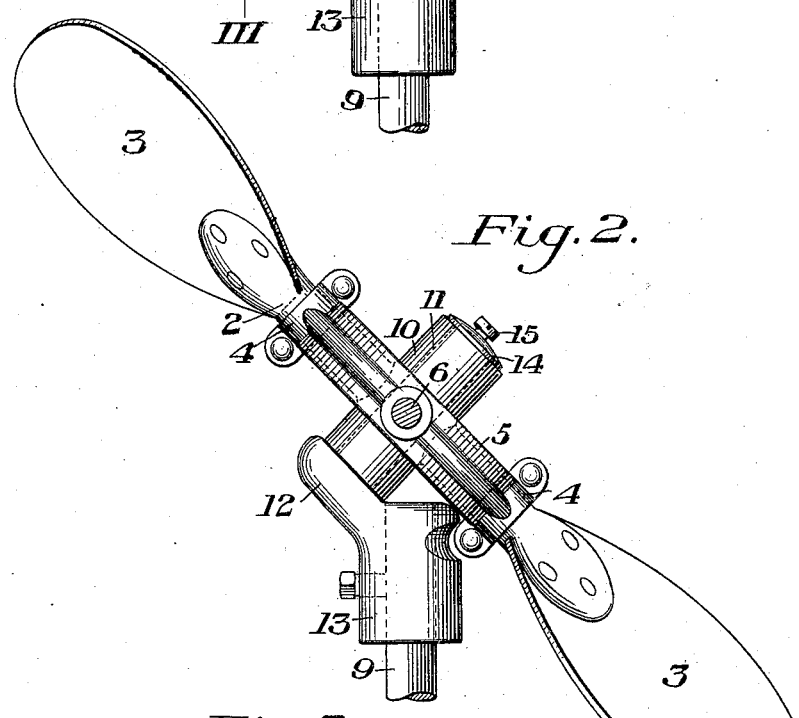
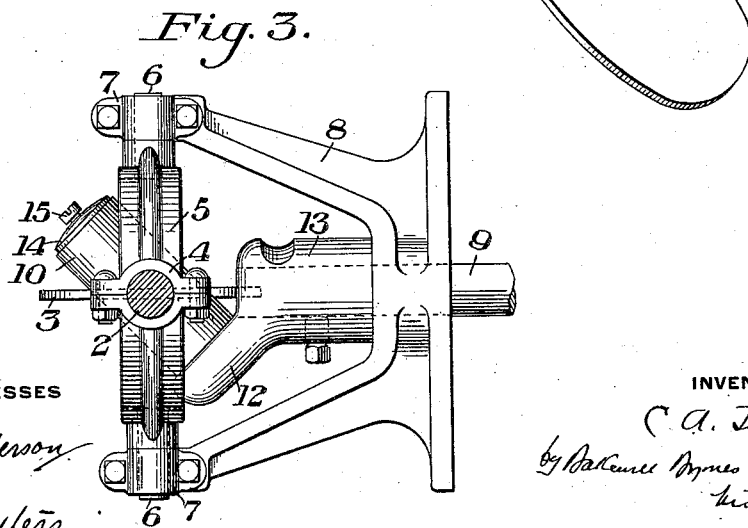
WITNESSES
INVENTOR

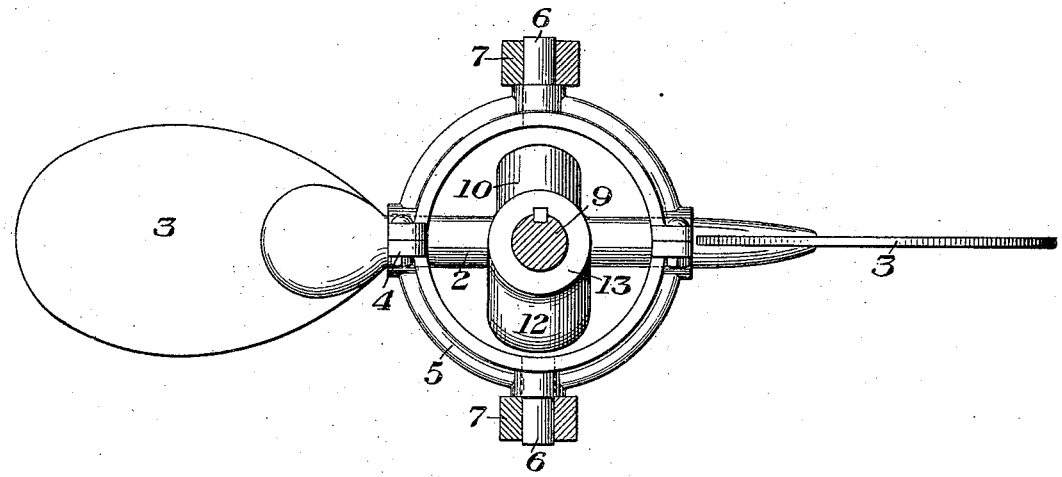
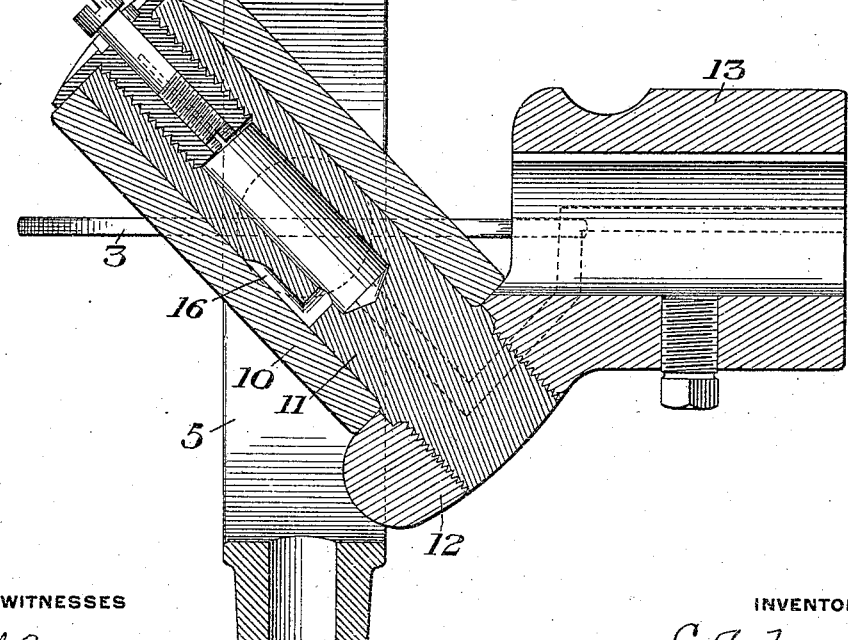

UNITED STATES PATENT OFFICE.

CLINTON A. TOWER, OF CLEVELAND, OHIO.

MECHANICAL MOVEMENT.

940,753.  Specification of Letters Patent.  Patented Nov. 23, 1909.

Application filed July 17, 1909. Serial No. 508,087.

*To all whom it may concern:*

Be it known that I, CLINTON A. TOWER, of Cleveland, Cuyahoga county, Ohio, have invented a new and useful Improvement in Mechanical Movements, of which the following is a full, clear, and exact description, reference being had to the accompanying drawings, forming part of this specification, in which—

Figure 1 is a top plan view of my improved apparatus showing one position of the same; Fig. 2 is a similar view showing another position; Fig. 3 is a side elevation; Fig. 4 is a sectional front elevation; and Fig. 5 is an enlarged vertical section.

My invention relates to mechanical movements, and is designed to provide an improved mechanical movement which is especially adapted for actuating propellers, such as ship propellers, aeroplane propellers, etc., which operate in a fluid.

The object of the invention is to convert a rotary movement into an oscillatory movement in a flat plane, together with a partial rotation of the oscillatory element which will cause feathering of the blades, where used on a propeller. In this way, each propeller blade is moved back and forth and at the same time turned on its own axis so as to present the greatest resistance on its power stroke and least resistance on its return stroke.

In the drawings, in which I show my invention as applied to a two-bladed propeller, 2 represents the cylindrical shank of a propeller, having blades 3, 3, set at an angle to each other, preferably a right angle. The cylindrical shank of the propeller is rotatably supported in bearings 4, 4, formed at the opposite sides of a ring or annulus 5, which in turn, is pivoted by trunnions, 6, 6, extending through fixed bearings 7, 7. The bearings 6, 6, are at right angles to the bearings 4, 4, and as shown, in the same plane, though they may be set otherwise than in the same plane. In the form shown, the ring is made in two parts, with the bearings made in halves, one on each part, and the bearings 7, 7 are carried on a frame 8, which is rigidly supported and may carry the bearing for the actuating rotary shaft 9. In place of the frame 8, the bearings 7, 7, for the ring 5 may be held from rotation by any suitable means.

The shank of the propeller is provided at its center with an integral or rigidly secured sleeve or tube 10, within which is arranged an angular stub shaft 11, which is rigidly secured to an angular projection 12, on a socket 13, keyed or otherwise secured to the end of the rotary actuating shaft 9.

The sleeve 10 may be secured on to the shaft 11 by any suitable means, as for example, the cap bolt 14, having an expanding screw device 15, for locking it in place. 16 indicates a lubricating hole which extends from the shaft 9 to a hollow cavity within the stub shaft 11, and thence to the bearing surface between it and the sleeve.

In the use of the device as a propeller, the frame 8, which carries the bearings 7, 7, is rigidly secured to the rear portion of the boat or other carrier, and when the shaft 9 is rotated, it causes the projection 12 to turn through a circular path, rotating the sleeve 10 and stub shaft 11 about an axis which is in line with the axis of the shaft 9 and inclined to the longitudinal center line of the sleeve 10 and stub shaft 11, thereby causing an oscillation of the shaft 2 with its ring 5, and an alternate back and forth movement of the propeller blades. As the propeller blades move back and forth, they are turned so that each on its rearward or power stroke is in a vertical position, while on its return stroke, it is swung into substantially horizontal position giving a feathering action. In the form shown, the socket 13 is slightly recessed on one side, in order to avoid contact with the ring, although the parts may be so proportioned that this is not needed.

The advantages of my invention result from the new movement by which a rotary motion is converted into an oscillating back and forth movement in a single plane, while at the same time, the oscillating element is turned on its axis. By this movement, when used on propellers, the swirling action set up in the fluid or liquid by the ordinary propeller is avoided. This swirling action of the fluid reduces the efficiency of the propeller, owing to its operating on fluid in motion instead of fluid at rest. By the use of my device, the propeller blades act by a series of alternate pushes of the blades, each push being followed by a return movement with a feathering action. The action of the two propeller blades, therefore, is somewhat similar to that of oars when feathered on their return stroke, although in my case, of course, they pass through the water.

The device is simple and can be cheaply and strongly made. By actual trials, the device is found to increase the speed of a boat over that of the ordinary propeller, when the same power is imparted to both.

Instead of an oscillating ring 5, a sphere or a portion of a sphere may be employed, having a slot at each side thereof, in which the cylindrical portion 2 of the propeller oscillates, said sphere being rigidly secured to the rear portion of the boat or other carrier. However, I prefer the form shown, as the friction is all rotary friction.

Other changes may be made in the form and arrangement of the parts without departing from my invention.

I claim:

1. As a new mechanical movement, a rotary shaft having an angular projection, a stub shaft secured to the projection and extending at an angle to the main shaft, and a double-ended element having rotary engagement with the stub shaft and arranged to be oscillated and turned during its oscillations, substantially as described.

2. As a new mechanical movement, a double-ended element arranged to be oscillated in a common plane and turned or feathered during its movements, said element having rotary engagement with an angular shaft secured to a rotary shaft, substantially as described.

3. As a new mechanical movement, a pivoted oscillatory element having mounted therein a double-ended element, said double-ended element having rotary engagement with an angular shaft secured to a rotary shaft and arranged to be moved through a circular path, substantially as described.

4. As a new mechanical movement, a pivoted ring having bearings receiving a shank with propeller blades or similar devices at its ends, a rotary shaft having an angular projection, and a rotary connection between the angular projection and the central portion of the propeller shaft, substantially as described.

In testimony whereof, I have hereunto set my hand.

CLINTON A. TOWER.

Witnesses:
HARRY E. ORR,
JOHN H. JASCHKA.